(12) United States Patent
Blum et al.

(10) Patent No.: US 7,868,055 B2
(45) Date of Patent: Jan. 11, 2011

(54) UV-HARDENABLE DISPERSIONS BASED ON POLYISOCYANATES

(75) Inventors: Harald Blum, Leverkusen (DE);
Erhard Luehmann, Bomlitz (DE);
Stefan Sommer, Leverkusen (DE);
Christoph Irle, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 274 days.

(21) Appl. No.: 12/011,875

(22) Filed: Jan. 30, 2008

(65) Prior Publication Data

US 2008/0194775 A1    Aug. 14, 2008

(30) Foreign Application Priority Data

Feb. 9, 2007    (DE) .................. 10 2007 006 492

(51) Int. Cl.
*C08G 18/04* (2006.01)
*C08G 18/79* (2006.01)
*C09D 175/14* (2006.01)
*C09J 175/14* (2006.01)
*C08J 3/28* (2006.01)

(52) U.S. Cl. ........................................ 522/84; 524/840
(58) Field of Classification Search .......... 524/590, 524/591, 840; 522/84–86
See application file for complete search history.

(56) References Cited

U.S. PATENT DOCUMENTS

| 5,135,963 | A | * | 8/1992 | Haeberle et al. | .............. | 522/84 |
| 5,290,663 | A | * | 3/1994 | Huynh-Tran | ............. | 430/284.1 |
| 5,594,065 | A | | 1/1997 | Tien et al. | | |
| 6,444,721 | B2 | | 9/2002 | Schwalm et al. | .............. | 522/84 |
| 6,747,088 | B1 | | 6/2004 | Schwalm et al. | ............ | 524/507 |
| 6,960,639 | B2 | * | 11/2005 | Weikard et al. | ............... | 528/45 |
| 2001/0029272 | A1 | | 10/2001 | Schwalm et al. | .............. | 522/90 |
| 2007/0149709 | A1 | | 6/2007 | Parker et al. | | |

FOREIGN PATENT DOCUMENTS

CA        2159265        3/1996

* cited by examiner

*Primary Examiner*—Susan W Berman
(74) *Attorney, Agent, or Firm*—Robert S. Klemz; Noland J. Cheung

(57) ABSTRACT

Aqueous UV-hardenable dispersions are provided, as well as their use for the production of coating agents, in particular coatings for ligneous substrates. The dispersions comprise the reaction product of a) one or more polyisocyanates of which at least one polyisocyanate is an oligomeric polyisocyanate of hexamethylene diisocyanate with urethane, biuret, iminooxadiazindione and/or isocyanurate structural units, b) one or more monohydroxy-functional compounds containing (meth)acryloyl groups, c) at least one component c1), which has a hydrophilising effect on the basis of incorporated (potentially) ionic groups and comprises at least one further isocyanate-reactive group and/or at least one component c2) which contains non-ionically hydrophilically acting groups and comprises at least one further isocyanate-reactive group, d) one or more difunctional and/or polyfunctional amines or hydroxyamines as chain extender, and e) optionally other monomeric, oligomeric and/or polymeric substances, which may optionally also contain further unsaturated groups.

15 Claims, No Drawings

UV-HARDENABLE DISPERSIONS BASED ON POLYISOCYANATES

CROSS-REFERENCE TO RELATED APPLICATION

This application claims priority under 35 U.S.C. §119(a-d) to German application No. 10 2007 006492.8, filed Feb. 9, 2007.

FIELD OF THE INVENTION

The present invention relates to new UV-hardenable dispersions based on polyisocyanates, a process for their production, and their use for the production of coating agents, in particular coatings for ligneous substrates.

BACKGROUND OF THE INVENTION

UV-hardenable dispersions according to the prior art very often contain polyester acrylate components as essential structural units. These polyester structures are potential weak points, since ester bonds are inherently susceptible to hydrolysis. Other dispersions according to the prior art contain larger amounts of polyether constituents, either incorporated in the polymer or as external substances acting as emulsifier or stabiliser. Such polyether structures, especially if they are contained in relatively large amounts, often lead in the case of coatings to increased sensitivities, for example to colouring liquids, and also have disadvantages as regards their weather resistance, including chalking (whitening) of the coating.

In EP 1 118 627 A1 weather-resistant, water-dispersible and radiation-hardenable polyurethanes are described, synthesised substantially from aliphatic or alicyclic polyisocyanates, cycloaliphatic diols and/or cycloaliphatic diamines, compounds containing unsaturated groups, and compounds with a dispersion-active group. The polyurethanes contain short-chain, cycloaliphatic diols or diamines as essential synthesis component. Methylene- or isopropylidene-bis(cyclohexylamine), piperazine, 1,4-diaminocyclohexane or 1,4-bisaminomethyl-cyclohexane are named as possible cycloaliphatic diamines. As hydrophilic component these comprise exclusively ionic-hydrophilising structural units. The disadvantage of the polyurethanes disclosed there is their high proportion of cycloaliphatic diols. This leads to coatings which have only a very limited elasticity. Such coatings are as a rule not suitable for use on wood or plastics. Also, the reactivity of these dispersions is not always sufficient for many applications, especially in the industrial wood and furniture coating sector. The pendulum hardnesses disclosed in the Examples (Example 1: 114 pendulum seconds) are not particularly high and are not always adequate for wood coatings.

WO 01/23453 A1 describes aqueous polyurethane dispersions that can be hardened by UV radiation and heat, which apart from double bonds polymerisable by UV radiation also contain blocked polyisocyanate groups and in addition free hydroxyl groups. Such dual cure systems require elevated temperatures, as a rule above 100° C., for the hardening by reaction of the blocked polyisocyanate groups, as a result of which their use for temperature-sensitive substrates such as wood or plastics is greatly restricted or is impossible. The document discloses the coating of thermostable substrates such as metallic substrates for automobile painting. A chain extension reaction with diamines or polyamines for synthesising high molecular weight polyurethanes is not disclosed.

EP 0 704 469 A2 discloses radiation-hardenable, aqueous polyurethane dispersions based on polyester polyols with a specifically generated, broad molecular weight distribution. Structural units for the chain extension are disclosed only as an optional component.

SUMMARY OF THE INVENTION

The object of the present invention was to provide aqueous dispersions hardenable by high-energy radiation, in particular UV radiation, which exhibit an excellent firing of wood substrates, have high reactivities and permit the production of coatings with outstanding hydrolysis resistance, excellent resistance to chemicals, in particular to colouring liquids, and have very high hardnesses. In addition such dispersions should be able to be prepared simply and quickly, should contain as few volatile organic substances as possible, such as solvents or neutralising agents, and should have an excellent dispersion stability, in particular as regards changes in the mean particle size of the dispersions on storage and under shear stress and temperature stress. Moreover the dispersions should have a good re-emulsifiability, so that for example film residues that have dried on application substrates can easily be removed by re-emulsification with water or with water containing minor amounts of neutralising agent, and can possibly be re-utilised.

It was surprisingly found that UV-hardenable dispersions based on polyisocyanates, which comprise oligomeric polyisocyanates of hexamethylene diisocynate with urethane, biuret, iminooxadiazindione and/or isocyanurate structural units as synthesis component, and which contain diamines, polyamines, or hydroxyamines as chain extension structural units, meet the object mentioned above.

The present invention accordingly provides aqueous UV-hardenable dispersions based on polyisocyanates, containing as synthesis components a) one or more polyisocyanates with an average functionality of at least 2.2, of which at least one polyisocyanate is an oligomeric polyisocyanate of hexamethylene diisocyanate with urethane, biuret, iminooxadiazindione and/or isocyanurate structural units, b) one or more monohydroxy-functional compounds containing (meth)acryloyl groups, c) at least one component c1), which has a hydrophilising effect on the basis of incorporated (potentially) ionic groups and comprises at least one further isocyanate-reactive group and/or, preferably and, at least one component c2) which contains non-ionically hydrophilically acting groups and comprises at least one further isocyanate-reactive group, d) one or more difunctional and/or polyfunctional amines or hydroxyamines as chain extender, and e) optionally other monomeric, oligomeric and/or polymeric substances, which may optionally also contain further unsaturated groups.

The dispersions according to the invention thus comprise a polyurethane/polyacrylate polymer, which contains acrylate groups that are polymerisable by high-energy radiation or for example by addition of peroxide hardeners or azo-based hardeners, and which no longer contains free isocyanate groups.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The UV-hardenable polyisocyanate-based dispersions according to the invention contain 35 to 75 wt. %, preferably 40 to 75 wt. %, particularly preferably 45 to 75 wt. %, of component a), 10 to 50 wt. %, preferably 12 to 35 wt. %, particularly preferably 14 to 32 wt. %, of component b), 1.5 to 19 wt. %, preferably 2 to 13 wt. %, particularly preferably 2 to 9 wt. %, of component c), 0.1 to 10 wt. %, preferably 0.1 to 9 wt. %, particularly preferably 0.1 to 5 wt. %, of component d), wherein the percentage amounts of a) to d) total 100%.

In a preferred embodiment the UV-hardenable polyisocyanate-based dispersions according to the invention contain 0.5 to 40 wt. %, preferably 0.5 to 25 wt. %, of component e).

The UV-hardenable polyisocyanate-based dispersions according to the invention preferably contain at least one initiator and optionally further auxiliary substances and additives, which permit or accelerate a hardening with high-energy radiation, such as for example electron beams or UV radiation.

The UV-hardenable polyisocyanate-based dispersions according to the invention have, due to the incorporation of component(s) c), acid numbers of 0 to 26, preferably 3 to 20 and particularly preferably 5 to 16 mol.wt. KOH/g of substance, referred to solids contents.

The urethane group content (MOL.WT. urethane group=59 g/mol) is in the range from 8 to 30 wt. %, preferably 15 to 25 wt. %, referred to solids content.

Suitable polyisocyanates a) are, apart from the oligomeric polyisocyanates of hexamethylene diisocyanate with urethane, biuret, iminooxadiazindione and/or isocyanurate structural units, at least difunctional polyisocyanates such as for example 1,4-, 1,3-, and/or 1,2-cyclohexane diisocyanate, 1-methyl-2,4-diisocyanato-cyclohexane, 1-methyl-2,6-diisocyanato-cyclohexane, tetramethylene diisocyanate, octamethylene diisocyanate, decamethylene diisocyanate, dodecamethylene diisocyanate, $H_6$-2,4- and/or 2,6-diisocyanatotoluene, 4,4'-diisocyanatodiphenyl-methane, 2,4'-diisocyanato-diphenylmethane, 2,2'-diisocyanatodiphenylmethane, meta- and/or para-xylylene diisocyanate, 2,4-diisocyanatotoluene and/or 2,6-diisocyanatotoluene, isopropenyldimethyltoluylene diisocyanate, α,α,α,α',α'-tetramethyl-m- and/or p-xylylene diisocyanate, 1,6-hexamethylene diisocyanate, trimethylhexane diisocyanate, tetramethylhexane diisocyanate, nonane triisocyanate, 1-isocyanato-3,3,5-trimethyl-5-isocyanatomethylcyclohexane (isophorone diisocyanate), 4,4'-diisocyanato-dicyclohexylmethane and/or 2,4'-diisocyanato-dicyclohexylmethane and/or 2,2'-diisocyanatodicyclohexylmethane as well as mixtures of these diisocyanat-odicyclohexylmethanes and their monomethyl- and dimethyl-substituted derivatives, and/or higher functional reaction products, homologues, oligomers and/or polymers of the aforementioned at least difunctional polyisocyanates with urethane, biuret, carbodiimide, isocyanurate, allophanate, iminooxadiazindione and/or uretdione structural units. Proportions of monofunctional isocyanates, such as for example stearyl isocyanate, butyl isocyanate, phenyl isocyanate, or other compounds such as for Example 3-isocyanatopropyl-trialkoxysilane, may also be co-used.

The average functionality of the polyisocyanate component a) is at least 2.2 to 6, preferably 2.4 to 5, particularly preferably 2.6 to 4.5.

The polyisocyanate component a) preferably has a viscosity of less than 25000 mPas at 23° C., particularly preferably a viscosity of less than 15000 mPas at 23° C.

Preferably the polyisocyanate component a) consists of at least 40 wt. % of liquid oligomeric polyisocyanates based on hexamethylene diisocyanate with isocyanurate, biuret, uretdione, carbodiimide and/or iminooxadiazindione structural units, and of at most 60 wt. % of isophorone diisocyanate, $H_6$-2,4- or 2,6-toluylidene diisocyanate, 1,6-hexamethylene diisocyanate, 4,4'-diisocyanato-dicyclohexylmethane and/or 2,4'-diisocyanato-dicyclohexylmethane and/or 2,2'-diisocyanatodicyclohexylmethane and/or 2,4- and/or 2,6-toluylidene diisocyanate or their reaction products with trimethylolpropane, butanediol, ethylene glycol, diethylene glycol, propylene glycol or neopentyl glycol.

Particularly preferably the polyisocyanate component a) consists of at least 70 wt. % of oligomeric polyisocyanates based on hexamethylene diisocyanate with biuret, iminooxadiazindione and/or isocyanurate structural units, and of at most 30 wt. % of isophurone diisocyanate, 4,4'-diisocyanatodicyclohexylmethane and/or 2,4'-diisocynatodicyclohexylmethane and/or 2,2'-diisocyanatodicyclo-hexylmethane and/or 2,4- or 2,6-toluylidene diisocyanate. Suitable components b) are monohydroxy-functional compounds containing (meth)acryloyl groups, such as for example hydroxyethyl acrylate, 2-/3-hydroxypropyl acrylate, hydroxybutyl acrylate, 2-/3-/4-hydroxyethyl methacrylate, 2-/3-hydroxypropyl methacrylate, 2-/3-/4-hydroxybutyl methacrylate, ethoxylation and/or propoxylation products of the aforementioned hydroxy acrylates or hydroxy methacrylates, reaction products of trimethylol-propane, glycerol and/or pentaerythritol or their ethoxylation and/or propoxylation products with 2 or 3 equivalents of acrylic acid and/or methacrylic acid, reaction products of the aforementioned hydroxy acrylates or hydroxy methacrylates with caprolactone, reaction products of monoepoxides such as for example Cardura E10® (Monoepoxide, Hexion Speciality Chemicals, Netherlands) with acrylic acid and/or methacrylic acid, and mixtures of the aforementioned monohydroxy-functional compounds containing (meth)acryloyl groups.

Hydroxyethyl acrylate, hydroxypropyl acrylate and/or hydroxybutyl acrylate are preferably used.

The UV-hardenable dispersions according to the invention based on polyisocyanate preferably contain at least two different hydrophilically acting components c), namely at least one component c1) containing at least one isocyanate-reactive group, preferably an amino and/or hydroxyl group, and at least one incorporated (potentially) ionic group (acid group), preferably carboxyl group, as well as at least one component c2), which apart from one or two, preferably one, isocyanate-reactive group, also comprises non-ionically hydrophilising structural units, preferably based on polyalkylene oxide.

Suitable components c1) include for example mono- and dihydroxycarboxylic acids, mono- and diaminocarboxylic acids, mono- and dihydroxysulfonic acids, mono- and diaminosulfonic acids, as well as mono- and dihydroxyphosphonic acids or mono- and diaminophosphonic acids and their salts such as dimethylolpropionic acid, dimethylolbutyric acid, hydroxypivalic acid, N-(2-aminoethyl)-alanine, 2-(2-aminoethylamino)ethanesulphonic acid, ethylenediaminepropyl- or ethylenediaminebutylsulphonic acid, 1,2- or 1,3-propylenediamineethylsulfonic acid, malic acid, citric acid, glycolic acid, lactic acid, glycerine, alanine, taurine, lysine, 3,5-diaminobenzoic acid, an addition product of IPDI and acrylic acid (EP-A 0 916 647, Example 1) and their alkali metal and/or ammonium salts; the adduct of sodium bisulfite to butane-2-diol-1,4, polyether sulfonate, the propoxylated adduct of 2-butenediol and $NaHSO_3$, described for example in DE-A 2 446 440 (pages 5-9, Formulae I-III), as well as structural units convertible into cationic groups, such as N-methyldiethanolamine, as hydrophilic synthesis components. Preferred ionic or potential ionic compounds are those that have available carboxy or carboxylate and/or sulfonate groups and/or ammonium groups. Particularly preferred ionic compounds are those that contain carboxyl and/or sulfonate groups as ionic or potentially ionic groups, such as the salts of 2-(2-aminoethylamino)-ethanesulfonic acid or of the addition product of diamines such as for example ethylenediamine or isophoronediamine and acrylic acid (EP-A 0 916 647), Example 1) as well as of dimethylolpropionic acid.

Suitable non-ionically hydrophilically acting components c2) are for example polyoxyalkylene ethers that contain at least one hydroxy or amino group. These polyethers contain a proportion of 30 wt. % up to 100 wt. % of structural units that are derived from ethylene oxide. Suitable linearly synthesised polyethers having a functionality of between 1 and 3 are however also compounds of the general formula (I)

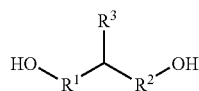

(I)

in which
$R^1$ and $R^2$ independently of one another in each case denote a divalent aliphatic, cycloaliphatic or aromatic radical with 1 to 18 C atoms, which can be interrupted by oxygen and/or nitrogen atoms, and
$R^3$ denotes an alkoxy-terminated polyethylene oxide radical.

Non-ionically hydrophilically acting compounds include for example also monohydric polyalkylene oxide polyether alcohols containing on average 5 to 70 ethylene oxide units per molecule, such as can be obtained in a manner known per se by alkoxylation of suitable starter molecules (for example in Ullmanns Encyclopädie der technischen Chemie, $4^{th}$ Edition, Vol. 19, Verlag Chemie, Weinheim, pp. 31-38).

Suitable starter molecules are for example saturated monohydric alcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxy-methyloxetane or tetrahydrofurfuryl alcohol, diethylene glycol monoalkyl ethers such as for example diethylene glycol monobutyl ether, unsaturated alcohols such as allyl alcohol, 1,1-dimethylallyl alcohol or oleic alcohol, aromatic alcohols such as phenol, the isomeric cresols or methoxyphenols, araliphatic alcohols such as benzyl alcohol, anise alcohol or cinnamic alcohol, secondary monoamines such as dimethylamine, diethylamine, dipropylamine, diisopropylamine, dibutylamine, bis-(2-ethylhexyl)-amine, N-methyl- and N-ethylcyclohexylamine or dicyclo-hexylamine, as well as heterocyclic secondary amines such as morpholine, pyrrolidine, piperidine or 1H-pyrazole. Preferred starter molecules are saturated monohydric alcohols. Particularly preferably diethylene glycol monomethyl, monoethyl or monobutyl ether is used as the starter molecule.

Suitable alkylene oxides for the alkoxylation reaction are in particular ethylene oxide and propylene oxide, which may be used in any order or also as a mixture in the alkoxylation reaction.

The polyalkylene oxide polyether alcohols are either pure polyethylene oxide polyethers or mixed polyalkylene oxide polyethers, whose alkylene oxide units consist in an amount of at least 30 mol %, preferably at least 50 mol %, of ethylene oxide units.

Preferred non-ionic compounds c2) are monohydroxyfunctional polyalkylene oxide polyethers which comprise at least 75 mol% of ethylene oxide units, particularly preferably 100 mol% of ethylene oxide units, and have a molecular weight of 350 to 2500 g/mol, particularly preferably 500 to 1100 g/mol.

It is preferred to use a mixture of components c1) and c2), and particularly preferred to use 1 to 8 wt. % of a mixture of salts of 2-(2-aminoethylamino)-ethanesulfonic acid and/or of the addition product of diamines such as for example ethylenediamine or isophorone diamine with acrylic acid and/or dimethylolpropionic acid as component c1), with at least one monohydroxy-functional polyalkylene oxide polyether of molecular weight from 500 to 1100 g/mol as component c2).

Suitable components d) that can be co-used are difunctional and/or trifunctional amines or hydroxyamines, which serve as chain extenders or to increase the molecular weight. Due to the chain extension reaction between the amino groups and the isocyanate groups, urea structural units are formed in the polyurethane polyacrylate dispersions. Proportions of hydroxyamines with only one amino group or monoamines may also be co-used, which then act as chain terminators.

By way of example there may be mentioned as components d) ethylenediamine, 1,3-propylenediamine, 1,6-hexamethylenediamine, 1,4-butanediamine, hydrazine(hydrate), aminofunctional polyethylene oxides or polypropylene oxides, which can be obtained for example under the name Jeffamin®, (Huntsman Corp. Europe, Belgium), monoamines or diamines containing alkoxysilane groups, diethylenetriamine, monoamines such as for example butylamine or diethylamine, triethylenetetramine, isophorone diamine, hydroxyamines such as for example diethanolamine, hydroxyethylethylenediamine and bishydroxyethylethylenediamine.

Preferred are linear aliphatic diamines such as ethylenediamine, hydrazine(hydrate) or 1,6-hexamethylenediamine, and also optionally aliphatic triamines such as diethylenetriamine.

Component d) is used in amounts such that the degree of chain extension is 30% to 200%. The degree of chain extension is defined as the ratio of the amount of equivalents of amino groups of the component d) to the amount of equivalents of isocyanate groups of the prepolymer A), which is obtained by reacting the components a), b), c) and optionally e). A degree of chain extension of 100% according to this definition is obtained if the amount of equivalents of amino groups of the component d) corresponds exactly to the amount of equivalents of isocyanate groups of the prepolymer A).

The degree of chain extension is preferably 100% to 200%, particularly preferably 106% to 150%.

Components e) that may optionally be co-used are other monomeric, oligomeric and/or polymeric substances, which may optionally also contain further unsaturated groups. These may for example be lower molecular weight alcohols such as butanediol, hexanediol, neopentyl glycol, diethylene glycol, triethylene glycol, propylene glycol, dipropylene glycol, tetraethylene glycol and/or trimethylolpropane, ethoxylated and/or propoxylated diols and/or triols, for example based on diethylene glycol or trimethylol propane, polycarbonate diols with a molecular weight of 700 to 2200 g/mol, polyether diols with a molecular weight of 300 to 200 g/mol, polyester diols, unsaturated alkyd resins containing fatty acids, monohydric alcohols such as for example benzyl alcohol, stearyl alcohol, 2-ethylhexyl alcohol, oleyl alcohol, butyl glycol, butyl diglycol, reaction products of monoepoxides such as for example Cardura® E10 and mono-carboxylic acids and/or oligoesters with OH numbers of 240 to 500, preferably 300 to 500 mol.wt. KOH/g of substance and a molecular weight Mw of 200 to 700, preferably 250 to 390 g/mol, and/or oligomers containing unsaturated groups, and/or hydroxyl-functional and/or non-isocyanate-reactive liquid polymers such as for example epoxy (meth)acrylates, ester (meth)acrylates, polyester (meth)acrylates, ether (meth)acrylates, polyether (meth)acrylates and/or urethane (meth)acrylates. A partial or complete incorporation into the polymer is possible via the hydroxyl groups.

Oligoesters are obtained by esterification of carboxylic acids such as for example adipic acid, isophthalic acid, phthalic anhydride, maleic anhydride, fumaric acid, tetrahydrophthalic acid, hexahydrophthalic acid, dimeric fatty acid, soya oil fatty acid, benzoic acid and/or glutaric acid with alcohols such as for example neopentyl glycol, hexanediol, ethylene glycol, propylene glycol, butanediol, diethylene glycol, dipropylene glycol, 1,4-cyclohexanedimethanol, 1,4-cyclohexanediol, TCD-diol, trimethylolpropane, glycerol and/or pentaerythritol. It is preferred to use adipic acid, isophthalic acid, phthalic anhydride, tetrahydrophthalic anhydride and/or hexahydrophthalic anhydride with neopentyl glycol, ethylene glycol, diethylene glycol, glycerol and/or trimethylol-propane. It is particularly preferred to use isophthalic acid or phthalic anhydride, optionally in combination with adipic acid and neopentyl glycol, optionally in combination with trimethylolpropane.

It is also possible to use simultaneously various components e) with and without hydroxyl groups, which means that a proportion of the component d) is incorporated into the polymer and a proportion is dispersed by the polymer. In this way it is possible for example to disperse so-called reactive diluents, i.e. substances that can flow or are liquid at room temperature, which do not contain hydrophilic groups but comprise unsaturated groups suitable for UV hardening, and thereby obtain stable dispersions based on polyisocyanate, for example with particularly high proportions of polymerisable groups or with chemically different polymer or oligomer backbones.

In a preferred embodiment there are used as component e) low molecular weight diols such as butanediol, hexanediol, neopentyl glycol, ethylene glycol, propylene glycol and/or polymer diols such as for example polycarbonate diols, polyester diols or epoxy acrylates, ester acrylates, polyester acrylates and/or monohydric alcohols such as for example benzyl alcohol, and/or reaction products of monoepoxides, such as for example Cardura® E10, with unsaturated fatty acids.

In a further preferred embodiment there are used as component e) oligoesters with OH numbers from 240 to 500, preferably 300 to 500 mol.wt. KOH/g of substance and with a molecular weight Mw of 200 to 700, preferably 250 to 390 g/mol, in an amount of 0.5 to 25 wt. %. The UV-hardenable dispersions according to the invention based on polyisocyanate can also be used mixed with other dispersions. These may be dispersions that likewise contain unsaturated groups, such as for example unsaturated dispersions containing polymerisable groups, based on polyester, polyurethane, polyepoxide, polyether, polyamide, polysiloxane, polycarbonate, polymer and/or polyacrylate.

There may also be admixed dispersions based for example on polyesters, polyurethanes, polyepoxides, polyethers, polyamides, polyvinyl esters, polyvinyl ethers, polysiloxanes, polycarbonates, polymers or polyacrylates, which contain functional groups such as for example alkoxysilane groups, hydroxy groups or isocyanate groups. Thus, for example, dual cure systems can be produced that can be hardened via two different mechanisms.

Coating agents containing the UV-hardenable dispersions according to the invention based on polyisocyanate, as well as cross-linking agents based on amino resins and/or polyisocyanates and/or blocked polyisocyanates are also covered by the present invention.

Suitable amino cross-linking resins are for example those based on melamine or urea. Suitable polyisocyanates are for example those mentioned in the description of a). Hydrophilising agents that are in principle suitable for the polyisocyanates, such as for example based on polyether, are named in the description of c). Suitable blocking agents are for example methanol, ethanol, butanol, hexanol, benzyl alcohol, acetoxime, butanoneoxime, caprolactam, phenol, dimethyl malonate, diethyl malonate, dimethylpyrazole, triazole, dimethyltriazole, acetic acid esters, diisopropylamine, dibutylamine, tert.butylbenzylamine, cyclopentanone carboxyethyl ester, dicyclohexylamine and/or tert.butylisopropylamine.

Dispersions based on polyesters, polyurethanes, polyepoxides, polyethers, polyamides, polysiloxanes, polyvinyl ethers, polybutadienes, polyisoprenes, chlorinated rubbers, polycarbonates, polyvinyl esters, polyvinyl chlorides, polymers or polyacrylates which do not contain functional groups, may also be admixed.

So-called reactive diluents, i.e. low viscosity compounds with unsaturated groups, such as for example hexanediol bisacrylate, trimethylolpropane trisacrylate, trimethylolpropane diacrylate, pentaerythritol tetraacrylate, dipentaerythritol hexaacrylate or diepoxy bisacrylates based on bisphenol A, may likewise be suitable for combination with the dispersions according to the invention.

The present invention also provides binder combinations containing the UV-hardenable dispersions according to the invention based on polyisocyanate, as well as one or more further dispersions.

The UV-hardenable dispersions according to the invention based on polyisocyanates may also be used mixed with non-water-soluble or water-dispersible oligomers or polymers containing unsaturated groups, in which the non-water-soluble or water-dispersible oligomers or polymers containing unsaturated groups are added to the UV-hardenable dispersions according to the invention based on polyisocyanates before the dispersion, whereby the UV-hardenable dispersions according to the invention based on polyisocyanates serve as polymeric emulsifiers for these substances. Preferred mixtures are binder combinations containing the UV-hardenable dispersions according to the invention based on polyisocyanates, as well as non-water-soluble or water-dispersible oligomers or polymers containing unsaturated groups.

The present invention also provides a process for the production of the UV-hardenable dispersions according to the invention based on polyisocyanates, characterised in that an isocyanate-functional prepolymer A) is obtained by reacting the components b) and c), optionally together with e), in one or more reaction steps, with an excess of component a), in which the neutralising agent for forming the ionic groups necessary for the dispersion can be added before, during or after this prepolymer production, followed by the dispersion step by addition of water to the prepolymer A) and transfer of the prepolymer A) to an aqueous receiving vessel, followed by a chain extension step by addition of the component d).

The invention also provides a process for the production of the UV-hardenable dispersions according to the invention based on polyisocyanates, characterised in that an isocyanate-functional prepolymer A) is obtained by reacting the components a), b) and c), optionally together with e), in one or more reaction steps, with an excess of component a), in which the neutralising agent for forming the ionic groups necessary for the dispersion can be added before, during or after this prepolymer production, followed by a chain extension step by addition of the component d), followed by the dispersion step by addition of water to the prepolymer A) and transfer of the prepolymer A) to an aqueous receiving vessel.

The present invention also provides a process for the production of the UV-hardenable dispersions according to the invention based on polyisocyanates, characterised in that an isocyanate-functional prepolymer A) is obtained by reacting the components b) and c), optionally together with e), in one or more reaction steps, with an excess of component A), in which the neutralising agent for forming the ionic groups necessary for the dispersion can be added before, during or after this prepolymer production, followed by the dispersion step by addition of water to the prepolymer A) and transfer of the prepolymer A) to an aqueous receiving vessel, followed by a chain extension step by addition of the component d).

The degree of chain extension is adjusted during the process according to the invention so that it is between 40% and 200%, preferably between 100% and 200%.

The dispersions according to the invention have solids contents of 25 to 65 wt. %, preferably of 35 to 60 wt. %.

In the process according to the invention an organic solvent and/or a catalyst may be employed in the production of the prepolymer A).

Suitable catalysts for the production of the prepolymer A) and/or of the dispersions according to the invention are in principle all compounds that catalyse the reaction of isocyanate groups with hydroxyl groups, such as for example tertiary amines, tin, zinc, zirconium, copper and/or bismuth compounds, preferably triethylamine, ethyldiisopropylamine, dimethylcyclohexylamine, N-methylmorpholine, 1,4-diazabicyclo-[2,2,2]-octane, tin dioctoate or dibutyltin dilaurate. Also suitable are salts of zinc, titanium and molybdenum. Suitable amounts are for example 0.002 to 1 wt. %, preferably 0.01 to 0.1 wt. %. The reaction may also be carried out without the use of a catalyst.

The production of the dispersions according to the invention takes place at 20° to 150° C., preferably at 25° to 75° C.

The component d) can in the process according to the invention be present diluted with water and/or organic solvents. The optionally employed solvent can then be separated by distillation. A production without use of solvents is possible, though a production in organic solvents is preferred.

The UV-hardenable dispersions according to the invention based on polyisocyanates contain less than 5 wt. %, preferably less than 1 wt. % and particularly preferably less than 0.5 wt. % of organic solvents.

The production is preferably carried out in 3 to 50 wt. %, particularly preferably in 5 to 25 wt. %, of acetone, followed by distillative removal of the solvent after production of the dispersion or during the dispersion step.

Suitable solvents are in principle all solvents or solvent mixtures that do not react with the reaction components, such as for example N-methylpyrrolidone, N-ethylpyrrolidone, butyl acetate, ethyl acetate, methoxypropyl acetate, diethylene glycol dimethyl ether, dioxane, dimethylformamide, xylene, toluene, solvent naphtha, cyclohexanone, methyl isobutyl ketone, diethyl ketone, methyl ethyl ketone, acetone. The solvents can then be removed wholly or partially by distillation. It is also possible to add further solvents after the production of the dispersion according to the invention, for example hydroxy-functional solvents, such as for example butyl diglycol, methoxypropanol or butyl glycol.

The aforementioned acids are converted into the corresponding salts by reaction with neutralising agents, such as for example triethylamine, ethyldiisopropylamine, dimethylcyclohexylamine, dimethylethanolamine, ammonia, N-methylmorpholine, NaOH, LiOH and/or KOH. In the case of neutralising agents that do not react with isocyanates, this can take place at any arbitrary time in the production up to and including the dispersion step. The degree of neutralisation, i.e. the number of equivalents of neutralising agent referred to the number of equivalents of potentially ionic groups of the component c1) may be between 30 and 150%, preferably between 50 and 110%.

The process for the production of the UV-hardenable dispersions according to the invention based on polyisocyanates is preferably carried out so that the characteristic number of the polypropylene A) is between 0.95:1 and 1.39:1, preferably between 1.005:1 and 1.15:1 and particularly preferably between 1.005:1 and 1,065:1.

The characteristic number of the prepolymer A) describes the ratio of equivalents of isocyanate groups of the component a) to the sum of the equivalents of the isocyanate-reactive hydroxy and/or amino groups of the components b), c) and optionally e).

The invention also provides for the use of the UV-hardenable dispersions according to the invention based on polyisocyanates for the production of paints, lacquers, e.g. clear lacquers/varnishes or pigmented lacquers or coatings or adhesives. They may in this connection be employed as the sole binder, as well as also in combination with other binder, which are preferably but not exclusively in the form of a dispersion.

Paints, lacquers, coating systems and adhesives based on the dispersions according to the invention can contain various types of auxiliary substances and additives, such as for example stabilisers, initiators, photo-initiators, antioxidants, flow improvers, peroxides, hydroperoxides, anti-foaming agents, drying agents, wetting agents, accelerators and/or light protection agents.

The normally employed compounds are suitable as photo-initiators, such as for example benzoin ether, benzyl ketals, hydroxyalkylphenones, benzophenones, alkylbenzophenones, halogenated/methylated benzophenones, Michlers ketone, halogenated benzophenones, anthraquinone and anthraquinone derivatives or oxime esters.

Suitable drying agents are for example cobalt, lead, zinc, copper, manganese or bismuth salts of acids such as-linseed oil fatty acid, tall oil fatty acid, soya oil fatty acid, abietic acid, naphthanenic acid or isooctanoic acid.

The following may be mentioned for example as (hydro) peroxides: dicumyl peroxide, di.tert.-butyl peroxide, benzoyl peroxide, cyclohexanone peroxide, methyl ethyl ketone peroxide, bis-(4-tert.butyl-cyclohexyl)peroxy dicarbonate, tert.-butylhydroperoxide, 2,5-dimethylhexane-2,5-hydroperoxide or hydrogen peroxide.

It is preferred to coat or paint ligneous substrates selected from the group comprising wood, parquet floors, furniture, doors, door and window frames or wood materials. It is also preferred to coat or paint plastics substrates. Metallic or mineral substrates, plastics, paper, cardboard, cork, leather, imitation leather, textiles, ceramic or also other materials can also be coated.

The coating agents can be applied in a known manner by spraying, knife-coating, rolling, brushing, dipping or casting. After the water and the organic solvents have been evaporated the coatings can be cross-linked either by means of high-energy radiation such as UV light, electron beams or gamma ray beams, or by hardening with metal salts of drying acids and/or (hydro)peroxides.

Coating agents containing the UV-hardenable dispersions according to the invention based on polyisocyanates, as well as cross-linking agents based on amino resins and/or polyisocyanates and/or blocked polyisocyanates are also provided by the present invention. Suitable amino cross-linking resins are for example those based on melamine or urea.

EXAMPLES

Example 1

468 g of Desmodur N 3300® (trimer with isocyanurate structural units based on hexamethylene diisocyanate, Bayer MaterialScience AG, Germany), 34.8 g of dimethylolpropionic acid, 0.4 g of Desmorapid Z® (tin catalyst, Bayer MaterialScience AG, Germany), and 0.4 g of 2,6-di-tert-butyl4-methylphenol are dissolved in 300 g of acetone and homogenised. 204.2 g of hydroxyethyl acrylate are metered in at 55° C. in such a way that the temperature does not rise above 65° C. After the theoretical NCO value has been reached, a solution of 5.86 g of ethylenediamine (degree of chain extension 117%) in 32 g of acetone is added and stirred for 30 minutes. After adding 19 g of triethylamine, 980 g of distilled water are added to the dispersion and the acetone is distilled off under a slight vacuum. A dispersion based on polyisocyanate 1) with a solids content of 37%, a pH value of 7.9 and a mean particle size of 97 nm is obtained.

The dispersions based on polyisocyanates 1) to 6) are mixed with 1% of the photoinitiator Irgacure® 500 (photoinitiator mixture of benzophenone and 1-hydroxycyclohexylphenyl ketone, Ciba AG, Switzerland) and are applied in a wet film thickness of 2×150 µm with a box-type doctor knife to beech boards to test the resistance properties, and to sapele boards to test the film-optical properties. After each application the board is dried for 10 minutes at 50° C. The UV hardening is carried out with a HG lamp (80 W/cm) at a strip speed of 5 m/min. To test the reactivity the hardness obtained after the hardening is measured in pendulum seconds, the first measurement value being taken at a strip speed of 5 m/minute, the second measurement value at a strip speed of 10 m/minute and the third measurement value at a strip speed of 15 m/minute. If the pendulum hardness remains at values significantly above 100 pendulum seconds even at the highest strip speed, the coating has an excellent reactivity.

After the UV hardening the boards are stored for 16 hours at room temperature and then subjected to the tests.

TABLE 1

Data relating to the application technology testing

| Application technology testing | Example 1 |
|---|---|
| Film transparency* | 5 |
| Firing** | 4+ |
| Storage stability: | |
| 50° C./24 hours | ok |
| 40° C./28 days | ok |
| Water resistance (16 hours exposure)*** | 5 |
| Coffee resistance (16 hours exposure)*** | 5 |
| Ethanol/water (1:1) resistance (16 hours exposure)*** | 5 |
| Red wine resistance (16 hours exposure)*** | 5 |
| Iodine resistance (16 hours exposure)*** | 3 |
| Ethanol resistance (16 hours exposure). $1^{st}$ value obtained directly after exposure; $2^{nd}$ value obtained after 3-day recovery of the paint film)*** | 4/5 |
| Reactivity (pendulum hardness in seconds) | 174/154/146 |
| Adhesion**** | 5 |
| Blushing after scratching***** | 5 |

Evaluation scores: 0 to 5
5 = excellent;
4 = very good;
3 = good;
2 = satisfactory;
1 = poor; 0 = very poor
The pendulum hardness and pendulum damping is measured in pendulum seconds according to König (DIN 53157).
*The film transparency is evaluated visually by spreading a film on a glass plate and then physically drying the film;
Score 5: clear, no detectable turbidity and fogging
Score 4: at an observation angle of ca. 10°-20° C. a slight fogging can be detected
Score 3: at an observation angle of ca. 45°-80° C. a slight turbidity can be detected
Score 2: significant turbidity
Score 1: matt or grainy surface
**The firing of the ligneous substrate is evaluated on a sapele substrate by visual inspection by a trained and experience paint technician.
***The resistance properties are evaluated by visual inspection after 16 hours exposure. If no changes of any type can be detected, the result is classed as excellent (= score 5).
****The adhesion is determined by the cross-hatch adhesion test (DIN 53151). GT 0 is classed as excellent adhesion (= score 5).
*****The blushing after scratching is tested by scratching with a coin. If no blushing can be detected at the scratching site, then this result is classed as excellent (score 5).

The dispersion 1) shows overall an excellent property spectrum, and in particular very good resistance properties even under long-term exposure and also good resistances to highly colouring liquids, such as for example iodine, an extremely high reactivity, and coatings with very good transparency and a very good firing of the ligneous substrate.

Example 2

482 g of Desmodur N 3300® (trimer with isocyanurate structural units based on hexamethylene diisocyanate, Bayer MaterialScience AG, Germany) 38.6 g of methoxypolyethylene glycol, mol. wt.750 (Carbowax® MPEG 750, DOW Chemical Company, USA), 19.9 g dimethylolpropionic acid, 0.4 g of Desmorapid Z® (tin catalyst, Bayer MaterialScience AG, Germany), and 0.8 g of 2,6-di-tert-butyl-4-methylphenol are dissolved in 130 g of acetone and homogenised. 232 g of hydroxyethyl acrylate are metered in at 55° C. in such a way that the temperature does not rise above 65° C. After the theoretical NCO value has been reached, 15 g of triethylamine are added and the prepolymer solution is dispersed in 990 g of distilled water. A solution of 4.2 g of ethylenediamine (degree of chain extension 117%) in 38 g of water is then added and stirred until isocyanate groups can no longer be detected. The acetone is distilled off under a slight vacuum. A dispersion based on polyisocyanate 2) with a solids content of 42%, a pH value of 8.2 and a mean particle size of 78 nm is obtained.

Example 3

468 g of Desmodur N 3300® (trimer with isocyanurate structural units based on hexamethylene diisocyanate, Bayer MaterialScience AG, Germany) 37.5 g of methoxypolyethylene glycol, mol. wt.750 (MPEG 750, DOW Chemical Company, USA), 19.3 g of dimethylolpropionic acid, 0.36 g of Desmorapid Z® (tin catalyst, Bayer MaterialScience AG, Germany), and 0.76 g of 2,6-di-tert-butyl-4-methylphenol are dissolved in 130 g of acetone and homogenised. 252.2 g of hydroxypropyl acrylate are metered in at 55° C. in such a way that the temperature does not rise above 70° C. After the theoretical NCO value has been reached, 12.4 g of triethylamine are added and the prepolymer solution is dispersed in 732 g of distilled water. A solution of 4.2 g of ethylenediamine (degree of chain extension 117%) in 38 g of water is then added and stirred until isocyanate groups can no longer be detected. The acetone is distilled off under a slight vacuum. A dispersion based on polyisocyanate 3) with a solids content of 40.5%, a pH value of 8.2 and a mean particle size of 92 nm is obtained.

Example 4

602.6 g of Desmodur N 3300® (trimer with isocyanurate structural units based on hexamethylene diisocyanate, Bayer MaterialScience AG, Germany) 67.6 g of methoxypolyethylene glycol, mol.wt. 750 (MPEG 750, DOW Chemical Company, USA), 12.4 g of dimethylolpropionic acid, 8.3 g of butanediol, 0.5 g of Desmorapid Z® (tin catalyst, Bayer MaterialScience AG, Germany), and 1.0 g of 2,6-di-tert-butyl4-methylphenol are dissolved in 168 g of acetone and homogenised. 287 g of hydroxyethyl acrylate are metered in at 55° C. in such a way that the temperature does not rise above 65° C. After the theoretical NCO value has been reached, 6.6 g of triethylamine are added and the prepolymer solution is dispersed in 902 g of distilled water. A solution of 5.3 g of ethylenediamine (degree of chain extension 117%) in 47 g of water is then added and stirred until isocyanate groups can no longer be detected. The acetone is distilled off under a slight vacuum. A dispersion based on polyisocyanate 4) with a solids content of 47.2%, a pH value of 8.0 and a mean particle size of 112 nm is obtained.

Example 5

662.8 g of Desmodur N 3300® (trimer with isocyanurate structural units based on hexamethylene diisocyanate, Bayer MaterialScience AG, Germany) 23.4 g of methoxypolyethylene glycol, mol.wt. 750 (MPEG 750, DOW Chemical Company, USA), 28.1 g of dimethylolpropionic acid, 5.4 g of butanediol, 0.6 g of Desmorapid Z® (tin catalyst, Bayer MaterialScience AG, Germany), and 1.1 g of 2,6-di-tert-butyl-4-methylphenol are dissolved in 181 g of acetone and homogenised. 308.9 of hydroxyethyl acrylate are metered in at 55° C. in such a way that the temperature does not rise above 68° C. After the theoretical NCO value has been reached, 12.7 g of triethylamine are added and the prepolymer solution is dispersed in 759 g of distilled water. A solution of 5.8 g of ethylenediamine (degree of chain extension 117%) in 52 g of water is then added and stirred until isocyanate groups can no longer be detected. The acetone is distilled off under a slight vacuum. A dispersion based on polyisocyanate 5) with a solids content of 56.4%, a pH value of 7.7 and a mean particle size of 221 nm is obtained.

Example 6

723.1 g of Desmodur N 3300® (trimer with isocyanurate structural units based on hexamethylene diisocyanate, Bayer MaterialScience AG, Germany) 45.9 g of methoxypolyethylene glycol, mol.wt. 750 (MPEG 750, DOW Chemical Company, USA), 22.2 g of dimethylolpropionic acid, 10.2 g of butanediol, 0.6 g of Desmorapid Z® (tin catalyst, Bayer MaterialScience AG, Germany), and 1.2 g of 2,6-di-tert-butyl-4-methylphenol are dissolved in 201 g of acetone and homogenised. 336.9 g of hydroxyethyl acrylate are metered in at 55° C. in such a way that the temperature does not rise above 68° C. After the theoretical NCO value has been reached, 10.9 g of triethylamine are added and the prepolymer solution is dispersed in 678 g of distilled water. A solution of 5.9 g of ethylenediamine (degree of chain extension 110%) in 53.5 g of water is then added and stirred until isocyanate groups can no longer be detected. The acetone is distilled off under a slight vacuum. A dispersion based on polyisocyanate 6) with a solids content of 57.2%, a pH value of 7.9 and a mean particle size of 191 nm is obtained.

TABLE 2

| Application technology testing | | | | | |
| --- | --- | --- | --- | --- | --- |
| | Ex. 2 | Ex. 3 | Ex. 4 | Ex. 5 | Ex. 6 |
| Film transparency | 5 | 5 | 5 | 5 | 5 |
| Filling****** | 4 | 4 | 4 | 5 | 5 |
| Storage stability | | | | | |
| 50° C./24 hours | ok | ok | ok | ok | ok |
| 40° C./28 days | ok | ok | ok | ok | ok |
| Water resistance (16 hours exposure) | 5 | 5 | 5 | 5 | 5 |
| Scratch resistance after water exposure | 4 | 4 | 5 | 5 | 5 |
| Coffee resistance (16 hours exposure) | 5 | 5 | 5 | 5 | 5 |
| Ethanol/water (1:1) resistance (6 hours exposure, 3 days recovery) | 5 | 5 | 5 | 5 | 5 |
| Ethanol resistance (xx exposure: 3 days recovery) | 4 | 5 | 5 | 5 | 5 |
| Red wine resistance | 5 | 5 | 5 | 5 | 5 |
| Re-emulsifiability******* | Not tested | 2+ | 1+ | 2+ | 2+ |
| Reactivity (pendulum hardness) | 174/ 154/ 146 sec. | 147/ 141/ 136 sec. | 139/ 137/ 122 sec. | 161/ 155/ 147 sec. | 154/ 150/ 144 sec. |

TABLE 2-continued

Application technology testing

|  | Ex. 2 | Ex. 3 | Ex. 4 | Ex. 5 | Ex. 6 |
|---|---|---|---|---|---|
| Firing | 4+ | 4+ | 4+ | 5+ | 5+ |
| Adhesion | 5 | 5 | 4 | 5 | 5 |
| Blushing after scratching | 5 | 5 | 5 | 5 | 5 |

*****The filling build-up of the coating on a wood surface is evaluated visually. The painted surface is evaluated visually as regards the filling build-up and a relative score of 1 to 5 is allocated.
Score 5: very high degree of filling (closed pore structure)
Score 4: very high degree of filling (slight depressions still recognisable in the pore region)
Score 3: medium degree of filling (pores are clearly recognisable)
Score 2: slighter degree of filling, the paint film already having been penetrated at least in part down to the substrate
Score 1: paint film is completely penetrated in the substrate
*******Re-emulsifiability:

To clean application equipment a dried dispersion should be able to be re-emulsified with water so that a finely particulated dispersion is re-formed.

For this purpose the dispersion is spread with a box-type doctor knife onto the glass plate. The glass plate and coating are then physically dried. The glass plate is placed on a black background and about 3 drops of water are poured onto the surface. The time after which the wetted surface starts to blush is determined. After a wetting time of 3 minutes the water droplets are stirred with a finger (finger test) and it is evaluated whether the softened film has become creamy/smeared or is like skin.

A score of 1 to 5 is allocated to the time when the colour changes, and a characterising sign (+ and −) is allocated to the finger test.

The overall score thus consists of a sign and a score:
(+) creamy/smeared (positive) (−) like skin (negative)
Score 1: 0-20 sec
Score 2: 21-50 sec
Score 3: 51-80 sec
Score 4: 81-180 sec
Score 5: >180 sec The UV-hardenable dispersions based on polyisocyanate according to Examples 2 to 6 similarly show an excellent property spectrum as regards film optics, firing of the ligneous substrate, degree of filling, resistance properties and film mechanics. The reactivity and pendulum hardness are also very high.

The processability is overall excellent. The re-emulsifiability and thus the ability to clean application instruments and tools to remove dried polymer films fully meets the requirements.

Example 7

602.6 g of Desmodur N 3300® (trimer with isocyanurate structural units based on hexamethylene diisocyanate, Bayer Material Science AG, Germany) 29 g of methoxypolyethylene glycol, mol.wt. 750 (MPEG 750, DOW Chemical Company, USA), 38 g of dimethylolpropionic acid, 136.5 g of a hydroxy-functional reaction product of 1 mol of Cardura E10 (monoepoxide, Hexion Speciality Chemicals, Netherlands) and 1 mol of soya oil fatty acid, the reaction being carried out at 130° C. in the presence of 100 ppm of tetrabutylammonium chloride, and 0.5 g of Desmorapid Z® (tin catalyst, Bayer MaterialScience AG, Germany), and 1 g of 2,6-di-tert-butyl-4-methylphenol are dissolved in 150 g of acetone and homogenised. 247.9 g of hydroxyethyl acrylate are metered in at 55° C. in such a way that the temperature does not rise above 68° C. After the theoretical NCO value has been reached, 18.6 g of triethylamine are added and the prepolymer solution is dispersed in a mixture of 3 g of ethylenediamine (degree of chain extension 114%) and 770 g of distilled water, and the acetone is then distilled off under a slight vacuum. A dispersion based on polyisocyanate 7) with a solids content of 40%, a pH value of 7.8 and a mean particle size of 150 nm is obtained.

The application technology testing according to the procedure described above for Examples 1) to 6) shows for the dispersion 7) the highest evaluation score 5 for film homogeneity, film transparency, blushing after scratching, and resistance to water, coffee, ethanol, red wine and a 1:1 water/ethanol mixture. The firing, degree of filling and adhesion have an evaluation score of 4. The re-emulsifiability is evaluated as 2+ and is therefore also very good.

Example 8

164.4 g of an oligoester (esterification product of 6574 g of isophthalic acid, 1327 g of trimethylolpropane and 7207 g of neopentyl glycol, acid number<2, OH number=366 mol.wt. KOH/g substance, molecular weight Mw=346 g/mol), 8.1 g of methoxypolyethylene glycol, mol.wt. 750 (MPEG 750, DOW Chemical Company, USA), 36.4 g of dimethylolpropionic acid, 189.7 g of hydroxyethyl acrylate, 0.1 g of Desmorapid SO® (tin catalyst, Bayer MaterialScience AG, Germany), and 0.4 g of 2,6-di-tert-butyl-4-methylphenol are dissolved in 234 g of acetone at 40° C., following which 267.2 g of diisocyanatodicyclohexylmethane (Desmodur W® Bayer Material Science AG, Germany) and then 269.2 g of Desmodur N 3300® (Timer with isocyanurate structural units based on hexamethylene diisocyanate, Bayer MaterialScience AG, Germany) are next added in such a way that the reaction temperature does not rise above 65° C. due to release of heat. The mixture is stirred at 60° C. until the theoretical NCO value of 0.56% is reached. 17.4 g of triethylamine are then added and the prepolymer solution is dispersed by adding 727 g of distilled water. A solution of 5.2 g of ethylenediamine (degree of chain extension 111%) in 20 g of distilled water is then added and the acetone is next distilled off under a slight vacuum. A dispersion based on polyisocyanate 8) with a solids content of 48%, a pH value of 7.8 and a mean particle size of 220 nm is obtained.

The application technology testing according to the procedure described above for Examples 1) to 6) shows for the dispersion 8) the highest evaluation score 5 for film homogeneity, film transparency, adhesion, and resistance to water, coffee, ethanol, red wine and a 1:1 water/ethanol mixture. The firing is good. The film dries physically with a pendulum harness of 18 sec. The reactivity (measured via the pendulum hardness as a function of the exposure time) is, with a value of 178/171/165 sec., also very high.

The dispersions according to the invention thus satisfy all the stipulated requirements.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Aqueous UV-hardenable dispersions comprising the reaction product of
   a) one or more polyisocyanates with an average functionality of at least 2.2, of which at least one polyisocyanate is an oligomeric polyisocyanate of hexamethylene diisocyanate with urethane, biuret, iminooxadiazindione and/or isocyanurate structural units, wherein the polyisocyanate component comprises at least 40 wt. % of liquid oligomeric polyisocyanates based on hexamethylene diisocyanate with isocyanurate, biuret, uretdione, carbodiimide and/or iminooxadiazindione structural units, and at most 60 wt. % of isophorone diisocyanate, H6-2,4- and/or 2,6-toluylidene diisocyanate, 1,6-hexamethylene diisocyanate, 4,4'-diisocyanatodicyclohexylmethane and/or 2,4'-diisocyanatodicyclo-hexylmethane and/or 2,2'-diisocyanatodicyclohexylme-thane and/or 2,4- and/or 2,6-toluylidene diisocyanate and/or their reaction products with trimethylolpropane, butanediol, ethylene glycol, diethylene glycol, propylene glycol or neopentyl glycol,
   b) one or more monohydroxy-functional compounds containing (meth)-acryloyl groups,
   c) at least one component c1), which has a hydrophilising effect on the basis of ionic or potentially ionic groups and comprises at least one further isocyanate-reactive group and at least one component c2) which contains non-ionically hydrophilically acting groups and comprises at least one further isocyanate-reactive group, wherein
      c1) comprises at least one compound selected from the group consisting of mono- and dihydroxycarboxylic acids, mono- and diaminocarboxylic acids, mono- and dihydroxysulfonic acids, mono- and diaminosulfonic acids, mono- and dihydroxyphosphonic acids, mono- and diaminophosphonic acids and their salts, an addition product of IPDI and acrylic acid and their alkali metal and/or ammonium salts, the adduct of sodium bisulfite to butane-2-diol-1,4, polyether sulfonate, the propoxylated adduct of 2-butenediol and NaHSO$_3$, as well as structural units convertible into cationic groups, such as N-methyldiethanolamine, addition product of (i) diamines and (ii) acrylic acid and/or dimethylolpropionic acid and
      c2) comprises at least one compound selected from the group consisting of polyoxyalkylene ethers which contain from 30 wt. % up to 100 wt. % of structural units that are derived from ethylene oxide of the general formula (I)

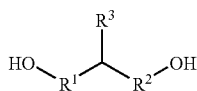

(I)

in which
   $R^1$ and $R^2$ independently of one another in each case denote a divalent aliphatic, cycloaliphatic or aromatic radical with 1 to 18 C atoms, which can be interrupted by oxygen and/or nitrogen atoms, and
   $R^3$ denotes an alkoxy-terminated polyethylene oxide radical,
   and monohydroxy-functional polyalkylene oxide polyethers which comprise at least 100 mol % of ethylene oxide units, and have a molecular weight of 350 to 2500 g/mol,
d) one or more difunctional and/or polyfunctional amines or hydroxyamines as chain extender, and
e) optionally other monomeric, oligomeric and/or polymeric substances, which may optionally also contain further unsaturated groups.

2. Aqueous UV-hardenable dispersions according to claim 1, containing
   35 to 75 wt. % of component a),
   10 to 50 wt. % of component b),
   1.5 to 19 wt. % of component c),
   0.1 to 10 wt. % of component d),
   wherein the percentage amounts of a) to d) total 100%.

3. Aqueous UV-hardenable dispersions according to claim 1, wherein the polyisocyanate component a) comprises at least 70 wt. % of oligomeric polyisocyanates based on hexamethylene diisocyanate with biuret, iminooxadiazindione and/or isocyanurate structural units and at most 30 wt. % of isophorone diisocyanate, 4,4'-diisocyanatodicyclohexylmethane and/or 2,4'-diisocyanatodicyclohexylmethane and/or 2,2'-diisocyanato-dicyclohexylmethane and/or 2,4- and/or 2,6-diisocyanatotoluene.

4. Aqueous UV-hardenable dispersions according to claim 1, containing 0.5 to 40 wt. % of component e).

5. Aqueous UV-hardenable dispersions according to claim 1, containing as component e) oligoesters with OH numbers of 240 to 500 mol. wt. KOH/g of substance, in an amount of 0.5 to 25 wt. %.

6. Aqueous UV-hardenable dispersions according to claim 1, wherein 2 to 8 wt. % of a mixture of salts of 2-(2-aminoethylamino)-ethanesulfonic acid and/or of the addition product of diamines with acrylic acid and/or dimethylolpropionic acid are used as component c1), and at least one monohydroxy-functional polyalkylene oxide polyether of molecular weight 500 to 1100 g/mol is used as c2).

7. Aqueous UV-hardenable dispersions according to claim 1, wherein linear aliphatic diamines, optionally in combination with triamines, are used as component d).

8. Aqueous UV-hardenable dispersions according to claim 1, wherein the component d) is used in such amounts that the degree of chain extension is between 100% and 200%.

9. Process for the production of the UV-hardenable dispersions according to claim 1, wherein an isocyanate-functional prepolymer A) is obtained by reacting the components a), b) and c) optionally together with e), in one or more reaction steps, with an excess of component a), wherein the neutralising agent for producing the ionic groups necessary for the dispersion can be added before, during or after this prepolymer production, followed by a chain extension step by adding the component d), followed in turn by the dispersion step by adding water to the prepolymer A) and transfer of the prepolymer A) to an aqueous receiver.

10. Process for the production of the UV-hardenable dispersions according to claim 1, wherein an isocyanate-functional prepolymer A) is obtained by reacting the components a), b) and c) optionally together with e), in one or more reaction steps, with an excess of component a), wherein the neutralising agent for producing the ionic groups necessary for the dispersion can be added before, during or after this prepolymer production, followed by the dispersion step by addition of water to the prepolymer A) and transfer of the prepolymer A) to an aqueous receiver, followed by a chain extension step by addition of the component d).

11. Process for the production of aqueous UV-hardenable dispersions according to claim 9, wherein the degree of chain extension is 100 to 200%.

12. Process for the production of aqueous UV-hardenable dispersions according to claim 9, wherein the ratio of equivalents of isocyanate groups of the component a) to the sum of the equivalents of the isocyanate-reactive hydroxy and/or amino groups of the components b), c) and optionally e) of the prepolymer A) is between 0.95:1 and 1.39:1.

13. A paint or coating or adhesive comprising the UV hardenable dispersions of claim 1.

14. Binder combinations containing UV-hardenable dispersions according to claim 1, further comprising one or more additional dispersions.

15. Coating agents containing UV-hardenable dispersions according to claim 1, further comprising amino resins and/or polyisocyanates and/or blocked polyisocyanates as crosslinking agents.

* * * * *